US009311109B2

(12) United States Patent
Hutchings et al.

(10) Patent No.: US 9,311,109 B2
(45) Date of Patent: *Apr. 12, 2016

(54) SYNCHRONIZING DEVICE ASSOCIATION DATA AMONG COMPUTING DEVICES

(71) Applicant: Microsoft Technology Licensing, LLC, Redmond, WA (US)

(72) Inventors: Justin A. Hutchings, Issaquah, WA (US); Erik O. Peterson, Kirkland, WA (US); Arun Babu Nagarajan, Redmond, WA (US); Kyle P. Wojtaszek, Bellevue, WA (US); J. Adrian Lannin, Sammamish, WA (US); Robert F. Hain, Redmond, WA (US); Esaias E. Greeff, Redmond, WA (US); Niket A. Sanghvi, Seattle, WA (US); Samuel David Adams, Bellevue, WA (US); David W. Duhon, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/665,891

(22) Filed: Mar. 23, 2015

(65) Prior Publication Data

US 2015/0254081 A1 Sep. 10, 2015

Related U.S. Application Data

(63) Continuation of application No. 13/931,690, filed on Jun. 28, 2013, now Pat. No. 9,032,106.

(60) Provisional application No. 61/828,671, filed on May 29, 2013.

(51) Int. Cl.
*G06F 3/00* (2006.01)
*G06F 15/16* (2006.01)
(Continued)

(52) U.S. Cl.
CPC ............ *G06F 9/4411* (2013.01); *G06F 9/4451* (2013.01); *G06F 13/10* (2013.01); *G06F 13/102* (2013.01); *G06F 13/385* (2013.01); *G06F 21/00* (2013.01)

(58) Field of Classification Search
CPC . H04L 2463/081; H04W 12/06; H04W 48/18
See application file for complete search history.

(56) References Cited

U.S. PATENT DOCUMENTS 5,583,917 A 12/1996 Jonsson
5,799,086 A 8/1998 Sudia
(Continued)

FOREIGN PATENT DOCUMENTS

CN 102119391 7/2011
EP 1528751 5/2005
(Continued)

OTHER PUBLICATIONS

"End User Configuration", Cisco Unified Communications Manager Administration Guide, Release 7.1(2), Available at <http://www.cisco.com/en/US/docs/voice_ip_comm/cucm/admin/7_1_2/ccmcfg/b08user.html>, May 31, 2009, 18 pages.
(Continued)

*Primary Examiner* — Hyun Nam
(74) *Attorney, Agent, or Firm* — Sunah Lee; Kate Drakos; Micky Minhas

(57) ABSTRACT

Device association data for peripheral devices, which is data used to connect to the peripheral devices, is maintained and synchronized across multiple computing devices associated with a user account on a service. When a new peripheral device is associated with a computing device, device association data for the new peripheral device is added to the computing device. The device association data for the new peripheral device is also sent to the service, which provides the device association to the other computing devices from which the user logs into his or her account, and those other computing devices in turn automatically associate themselves with the peripheral device. Device use data describing how a user desires to use the peripheral device on one computing device, as well as changes to the device association data on one computing device, can similarly be synchronized across the multiple computing devices.

19 Claims, 6 Drawing Sheets

(51) Int. Cl.
- *G06F 9/44* (2006.01)
- *G06F 13/10* (2006.01)
- *G06F 9/445* (2006.01)
- *G06F 21/00* (2013.01)
- *G06F 13/38* (2006.01)

(56) References Cited

U.S. PATENT DOCUMENTS

| | | | |
|---|---|---|---|
| 6,016,476 A | 1/2000 | Maes et al. | |
| 6,016,746 A | 1/2000 | Lake et al. | |
| 6,122,639 A | 9/2000 | Babu et al. | |
| 6,438,600 B1 | 8/2002 | Greenfield et al. | |
| 6,487,660 B1 | 11/2002 | Vanstone et al. | |
| 6,515,575 B1 | 2/2003 | Kataoka | |
| 6,941,148 B2 | 9/2005 | Hansmann et al. | |
| 6,976,253 B1 | 12/2005 | Wierman et al. | |
| 7,266,595 B1 | 9/2007 | Black et al. | |
| 7,620,667 B2 | 11/2009 | Rollin et al. | |
| 7,971,049 B2 | 6/2011 | TeNgaio et al. | |
| 8,086,676 B2 | 12/2011 | Palahnuk et al. | |
| 8,099,761 B2 | 1/2012 | Ganapathy | |
| 8,126,439 B1 | 2/2012 | Sankaranaraynan et al. | |
| 8,285,674 B2 | 10/2012 | Landry et al. | |
| 8,296,413 B2 | 10/2012 | Bornhoevd et al. | |
| 8,341,249 B2 | 12/2012 | Rakowski et al. | |
| 8,732,026 B2 | 5/2014 | Caballero et al. | |
| 8,769,612 B2 | 7/2014 | Ganapathy | |
| 8,943,551 B2 | 1/2015 | Ganapathy et al. | |
| 8,949,311 B2 | 2/2015 | Perham et al. | |
| 9,032,106 B2 | 5/2015 | Hutchings et al. | |
| 9,197,625 B2 | 11/2015 | Ganapathy et al. | |
| 2002/0194596 A1* | 12/2002 | Srivastava | 725/37 |
| 2003/0097503 A1* | 5/2003 | Huckins | 710/104 |
| 2003/0100307 A1 | 5/2003 | Wolochow et al. | |
| 2003/0115256 A1* | 6/2003 | Brockway et al. | 709/203 |
| 2003/0120725 A1 | 6/2003 | Chung et al. | |
| 2003/0192033 A1 | 10/2003 | Gartside et al. | |
| 2004/0128345 A1 | 7/2004 | Robinson et al. | |
| 2004/0203851 A1 | 10/2004 | Vetro et al. | |
| 2004/0210906 A1 | 10/2004 | Beresnevichiene et al. | |
| 2004/0225952 A1 | 11/2004 | Brown et al. | |
| 2005/0036509 A1 | 2/2005 | Acharya et al. | |
| 2005/0060561 A1 | 3/2005 | Pearson et al. | |
| 2005/0114711 A1 | 5/2005 | Hesselink et al. | |
| 2005/0208803 A1 | 9/2005 | Rohatgi et al. | |
| 2005/0220080 A1 | 10/2005 | Ronkainen et al. | |
| 2005/0257226 A1* | 11/2005 | Belvin et al. | 719/328 |
| 2005/0283836 A1 | 12/2005 | Lalonde et al. | |
| 2005/0289265 A1 | 12/2005 | Illowsky et al. | |
| 2006/0064493 A1 | 3/2006 | Hammell et al. | |
| 2006/0075494 A1 | 4/2006 | Bertman et al. | |
| 2006/0085639 A1 | 4/2006 | Phillips et al. | |
| 2006/0095954 A1 | 5/2006 | Buckley et al. | |
| 2006/0101514 A1 | 5/2006 | Milener et al. | |
| 2006/0123147 A1 | 6/2006 | Yasuhara | |
| 2006/0200856 A1 | 9/2006 | Salowey et al. | |
| 2006/0218549 A1 | 9/2006 | Hsu et al. | |
| 2006/0223516 A1 | 10/2006 | Fan et al. | |
| 2006/0224611 A1 | 10/2006 | Dunn et al. | |
| 2006/0253894 A1 | 11/2006 | Bookman et al. | |
| 2007/0079142 A1 | 4/2007 | Leone et al. | |
| 2007/0118891 A1 | 5/2007 | Buer | |
| 2007/0136746 A1 | 6/2007 | Bae et al. | |
| 2007/0168490 A1 | 7/2007 | Kent et al. | |
| 2007/0214272 A1 | 9/2007 | Isaacson | |
| 2007/0232272 A1 | 10/2007 | Gonsalves et al. | |
| 2007/0233647 A1 | 10/2007 | Rawat et al. | |
| 2007/0261114 A1 | 11/2007 | Pomerantsev | |
| 2007/0274422 A1 | 11/2007 | Shivaji-Rao et al. | |
| 2007/0283049 A1 | 12/2007 | Rakowski et al. | |
| 2008/0016231 A1 | 1/2008 | Itabashi et al. | |
| 2008/0076389 A1 | 3/2008 | Lee et al. | |
| 2008/0229389 A1 | 9/2008 | Singh et al. | |
| 2008/0299966 A1* | 12/2008 | Masuda | 455/432.1 |
| 2009/0024944 A1 | 1/2009 | Louch | |
| 2009/0125584 A1 | 5/2009 | Agrawala et al. | |
| 2009/0313363 A1 | 12/2009 | Parsons et al. | |
| 2010/0040233 A1* | 2/2010 | Ganapathy | 380/277 |
| 2010/0043056 A1* | 2/2010 | Ganapathy | 726/2 |
| 2010/0082652 A1 | 4/2010 | Jones et al. | |
| 2010/0107225 A1 | 4/2010 | Spencer et al. | |
| 2010/0110910 A1 | 5/2010 | Ercep et al. | |
| 2011/0225293 A1 | 9/2011 | Rathod | |
| 2011/0225640 A1 | 9/2011 | Ganapathy et al. | |
| 2012/0166544 A1 | 6/2012 | Wilder et al. | |
| 2012/0233253 A1 | 9/2012 | Ricci | |
| 2012/0246742 A1 | 9/2012 | Tresanti | |
| 2012/0290694 A9 | 11/2012 | Marl et al. | |
| 2013/0007050 A1 | 1/2013 | Work | |
| 2013/0024944 A1 | 1/2013 | Takayuki | |
| 2013/0054701 A1 | 2/2013 | Leeder et al. | |
| 2013/0058403 A1 | 3/2013 | Kimoto | |
| 2013/0085861 A1 | 4/2013 | Dunlap | |
| 2013/0282605 A1 | 10/2013 | Noelting | |
| 2014/0351958 A1 | 11/2014 | Sabulsky et al. | |
| 2014/0359170 A1 | 12/2014 | Hutchings et al. | |
| 2015/0058955 A1 | 2/2015 | Ganapathy et al. | |
| 2016/0014141 A1 | 1/2016 | Ganapathy et al. | |

FOREIGN PATENT DOCUMENTS

| | | |
|---|---|---|
| EP | 1832998 | 9/2007 |
| EP | 1862902 | 12/2007 |
| EP | 1873668 | 1/2008 |
| EP | 2158784 | 3/2010 |
| JP | 2000003336 | 1/2000 |
| JP | 2003199168 | 7/2003 |
| JP | 2006526208 | 11/2006 |
| JP | 2007274380 | 10/2007 |
| JP | 2009055259 | 3/2009 |
| JP | 2010128554 | 6/2010 |
| JP | 2010212878 | 9/2010 |
| JP | 2011530960 | 12/2011 |
| KR | 20110057149 | 5/2011 |
| RU | 61491 | 2/2007 |
| RU | 2011105187 | 8/2012 |
| RU | 2512118 | 4/2014 |
| TW | 200737898 | 10/2007 |
| WO | WO-02067483 | 8/2002 |
| WO | WO-2004090781 | 10/2004 |
| WO | WO-2005083941 | 9/2005 |
| WO | WO-2007149650 | 12/2007 |

OTHER PUBLICATIONS

"Extended European Search Report", EP Application No. 09807046.9, Jul. 9, 2012, 5 pages.

"Extended European Search Report", EP Application No. 09808633.3, Aug. 27, 2013, 7 pages.

"Final Office Action", U.S. Appl. No. 12/191,724, Oct. 9, 2013, 13 pages.

"Final Office Action", U.S. Appl. No. 12/191,724, Mar. 20, 2012, 12 pages.

"Final Office Action", U.S. Appl. No. 12/191,752, Jun. 29, 2011, 6 pages.

"Final Office Action", U.S. Appl. No. 13/113,384, Oct. 28, 2013, 11 pages.

"Foreign Office Action", JP Application No. 2011-523028, Aug. 5, 2013, 4 Pages.

"Foreign Notice of Allowance", JP Application No. 2011-523028, Jan. 7, 2014, 4 pages.

"Foreign Notice of Allowance", RU Application No. 2011105187, Oct. 23, 2013, 8 Pages.

"Foreign Notice of Allowance", TW Application No. 98126764, Oct. 29, 2014, 4 pages.

"Foreign Notice to Grant", CN Application No. 200980131660.0, Sep. 30, 2014, 4 Pages.

"Foreign Office Action", CN Application No. 200980131660.0, Feb. 16, 2013, 9 pages.

"Foreign Office Action", CN Application No. 200980131660.0, Mar. 25, 2014, 8 Pages.

(56) References Cited

OTHER PUBLICATIONS

"Foreign Office Action", CN Application No. 200980131660.0, Nov. 13, 2013, 8 Pages.
"Foreign Office Action", CN Application No. 200980131660.0, Jul. 5, 2013, 8 pages.
"Foreign Office Action", CN Application No. 200980131666.8, Apr. 3, 2013, 8 pages.
"Foreign Office Action", CN Application No. 200980131666.8, Oct. 22, 2013, 6 pages.
"Foreign Office Action", EP Application No. 09807046.9, Jul. 26, 2012, 1 pages.
"Foreign Office Action", JP Application No. 2011-523031, Jul. 30, 2013, 4 pages.
"Foreign Office Action", RU Application No. 2011105187, Jul. 17, 2013, 5 pages.
"International Search Report and Written Opinion", Application No. PCT/US2013/060489, Jan. 20, 2014, 11 pages.
"International Search Report and Written Opinion", Application No. PCT/US2009/051154, Feb. 11, 2010, 7 pages.
"International Search Report and Written Opinion", Application No. PCT/US2009/051628, Feb. 26, 2010, 8 pages.
"Microsoft Federation Gateway", Retrieved from: <http://msdn.microsoft.com/en-us/library/cc287610.aspx> on Feb. 3, 2011, Nov. 2009, 36 pages.
"Non-Final Office Action", U.S. Appl. No. 12/191,724, Apr. 18, 2013, 13 pages.
"Non-Final Office Action", U.S. Appl. No. 12/191,724, Sep. 26, 2011, 9 pages.
"Non-Final Office Action", U.S. Appl. No. 12/191,752, Jan. 24, 2011, 6 pages.
"Non-Final Office Action", U.S. Appl. No. 13/113,384, Jan. 4, 2013, 9 pages.
"Non-Final Office Action", U.S. Appl. No. 13/113,384, Mar. 6, 2014, 9 pages.
"Non-Final Office Action", U.S. Appl. No. 13/113,384, Jun. 20, 2013, 10 pages.
"Non-Final Office Action", U.S. Appl. No. 13/931,690, Jul. 8, 2014, 10 pages.
"Non-Final Office Action", U.S. Appl. No. 14/528,781, Nov. 26, 2014, 10 pages.
"Notice of Allowance", U.S. Appl. No. 12/191,724, Feb. 21, 2014, 4 pages.
"Notice of Allowance", U.S. Appl. No. 12/191,752, Sep. 19, 2011, 6 pages.
"Notice of Allowance", U.S. Appl. No. 13/113,384, Aug. 7, 2014, 4 pages.
"Notice of Allowance", U.S. Appl. No. 13/931,690, Dec. 23, 2014, 4 pages.
"Search Report", TW Application No. 98126764, Jul. 24, 2014, 1 page.
"The Next Generation of Computing", Microsoft Corporation—Available at <http://download.microsoft.com/download/D/D/7/DD72762A-8C7A-43A2-8F25-52DF120D3D37/msft_cloud_computing_lowres_100809.pdf> downloaded on Feb. 13, 2011, pp. 1-9.
Bertocci,"Claims and Identity: On-Premise and Cloud Solutions", Retrieved from: <http://msdn.microsoft.com/en-us/library/cc836390.aspx> on Feb. 3, 2011, Jul. 2008, 15 pages.
Chou,"Strong User Authentication on the Web", Retrieved from: <http://msdn.microsoft.com/en-us/library/cc838351.aspx> on Feb. 3, 2011, Aug. 2008, 10 pages.
Lin,"Cloud Data Storage for Group Collaborations", In Proceedings of WCE 2010, Available at <http://www.iaeng.org/publication/WCE2010/WCE2010_pp485-486.pdf>, Jul. 2, 2010, 2 pages.
Linsky,"Simple Pairing Whitepaper", http://www.bluetooth.com/NR/rdonlyres/0A0B3F36-D15F-4470-85A6-F2CCFA26F70F/0/SimplePairing_WP_V10r00.pdf, Aug. 3, 2006, 23 pages.
Malik,"Accessing Remote Application without Installation at Host End Through Cloud Computing", International Journal of Computer Applications (0975-8887), vol. 1, No. 11, Available at <http://www.ijcaonline.org/journal/number11/pxc387399.pdf>, 2010, pp. 44-46.
Maniatis,"The Mobile People Architecture", http://hpl.hpl.hp.com/personal/Mary_Baker/publications/maniatis99mobile.pdf, Jul. 1999, 7 pages.
Pals,"UML-Based Modeling of Roaming with Bluetooth Devices", 4 Roaming for Bluetooth, http://www.swe.ingormatik.uni-goettingen.de/publications/HP_ZD_JG_HN/uml_based_bt_modeling.pdf, 2003, 7 pages.
Panayiotou,"mPERSONA: Personalized Portals for the Wireless User: An Agent", http://softsys.cs.uoi.gr/dbglobe/publications/Samara-Monet-F.pdf, Dec. 2004, 28 pages.
"Android Fundamentals and Components", Internet Article, Reprinted form the Internet at: http://techblogon.com/android-fundamentals-components-activity-service-broadcast-receiver-content-provider, Jan. 27, 2014, 6 pages.
"Best Practices for Integrating OS X with Active Directory", In Apple Technical White Paper, Retrieved on: Apr. 16, 2013 at: http://training.apple.com/pdf/wp_integrating_active_directory_ml.pdf, 14 pages.
"Corrected Notice of Allowance", U.S. Appl. No. 14/528,781, Jul. 1, 2015, 8 pages.
"Final Office Action", U.S. Appl. No. 13/901,743, Mar. 13, 2015, 28 pages.
"Intents and Intent Filters", Internet Article, reprinted from the internet at: http//developer.android.com/guide/components/intents-filters.html, May 1, 2013, 13 pages.
"International Search Report and Written Opinion", Application No. PCT/US2013/060499, Jul. 25, 2014, 10 pages.
"International Search Report and Written Opinion", Application No. PCT/US2013/060494, Feb. 7, 2014, 11 pages.
"Mountain Lion: What You Need to Know", Available at: http://www.macworld.com/article/116546/mountain_lion_what_you_need_to_know.html, Jun. 13, 2012, 16 pages.
"Non-Final Office Action", U.S. Appl. No. 13/901,743, Sep. 30, 2014, 22 pages.
"Non-Final Office Action", U.S. Appl. No. 13/901,743, Oct. 1, 2015, 31 pages.
"Notice of Allowance", U.S. Appl. No. 14/528,781, Jun. 23, 2015, 11 pages.
"OS X Its what makes a Mac a Mac", Retrieved on: Apr. 15, 2013, Available at: http://www.apple.com/macbookair/osx.html, 5 pages.
Ableson,"Unlocking Android: A Developer's Guide", Manning Publications Series, Safari Books Online, Apr. 28, 2009, 49 pages.
Hollington,"Facebook Contact and Calendar Integration in iOS 6", Available at: http://www.ilounge.com/index.php/articles/comments/facebook-contact-and-calendar-integration-in-ios-6/, Oct. 18, 2012, 5 pages.
Nelson,"Setting up Facebook with Mac OS X Mountain Lion or Later", Available at: http://macs.about.com/od/Mountain-Lion-Tips/qt/Setting-Up-Facebook-With-Mac-Os-X-Mountain-Lion-Or-Later.htm, Oct. 4, 2012, 3 pages.
Sabulsky,"Service Profile Maintenance", U.S. Appl. No. 13/901,709, filed May 24, 2013, 23 pages.
Spidle,"How to Integrate Google Calendar Into Ubuntu", Available at: http://www.ehow.com/how_5664985_integrate-google-calendar-ubuntu.html, Feb. 5, 2010, 4 pages.
Warren,"iOS 6: Everything You Need to Know", Available at: http://mashable.com/2012/06/11/ios-6-revaled/, Jun. 11, 2012, 8 pages.
Xiong,"Preserving Data Privacy in Outsourcing Data Aggregation Services", In Journal of ACM Transactions on Internet Technology (TOIT)—Special Issue on the Internet and Outsourcing, vol. 7, Issue 3, Aug. 2007, 27 pages.
"Foreign Office Action", KR Application No. 10-2011-7003310, Nov. 6, 2015, 8 pages.

\* cited by examiner

SYNCHRONIZING DEVICE ASSOCIATION DATA AMONG COMPUTING DEVICES

RELATED APPLICATIONS

This application is a continuation of U.S. patent application Ser. No. 13/931,690, filed Jun. 28, 2013 titled "Synchronizing Device Association Data Among Computing Devices", the entire disclosure of which is hereby incorporated by reference herein in its entirety. U.S. patent application Ser. No. 13/931,690 claims priority under 35 U.S.C. §119(e) to U.S. Provisional Application No. 61/828,671, filed May 29, 2013, titled "Roaming Device Association Data Among Computing Devices," the entire disclosure of which is hereby incorporated by reference herein in its entirety.

BACKGROUND

As computing technology has advanced, the number of different computing devices available to people and that people use throughout the day has increased. When using these devices, people oftentimes desire to access the same peripheral devices, such as printers, scanners, headsets, and so forth. Being able to use the same peripheral devices with multiple computing devices is helpful to users as they are able to use the peripheral devices they are familiar with on different computing devices. However, using the same peripheral devices on multiple different computing devices is not without its problems. One such problem is that such peripheral devices need to be installed by the user on each of the multiple different computing devices, which can be a time consuming process and lead to a poor user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, device association data for a peripheral device describes how to connect to the peripheral device. Device association data for each of one or more peripheral devices associated with a user account is received. A determination is made as to which of the one or more peripheral devices can be automatically associated with the computing device, and those of the one or more peripheral devices that can be automatically associated with the computing device are automatically associated with the computing device.

BRIEF DESCRIPTION OF THE DRAWINGS

The same numbers are used throughout the drawings to reference like features.

DETAILED DESCRIPTION

Synchronizing device association data among computing devices is discussed herein. Device association data for one or more peripheral devices is maintained and synchronized among multiple different computing devices associated with a user account of a local or remote service. The device association data for a peripheral device is the data used to connect to the peripheral device, such as a network address of the peripheral device, security information used to communicate with the peripheral device, and so forth. The device association data is maintained by the computing devices from which the user accesses his or her user account as well as by the service associated with his or her user account.

When a new peripheral device is installed on or otherwise associated with a computing device, device association data for the new peripheral device is added to the computing device as well as to the service. When a user logs into his or her user account from a computing device, device association data for peripheral devices that is not already stored on the computing device is copied from the service to the computing device, and ones of those peripheral devices that can be automatically installed on or otherwise associated with the computing device are automatically installed on or otherwise associated with the computing device. Thus, when device association data for a peripheral device is added to a computing device or the service, the device association data is synchronized with the other computing devices from which the user logs into his or her account, the device association data being copied to those other computing devices and the peripheral devices being automatically installed on or otherwise associated with such other computing devices.

Figure 1:
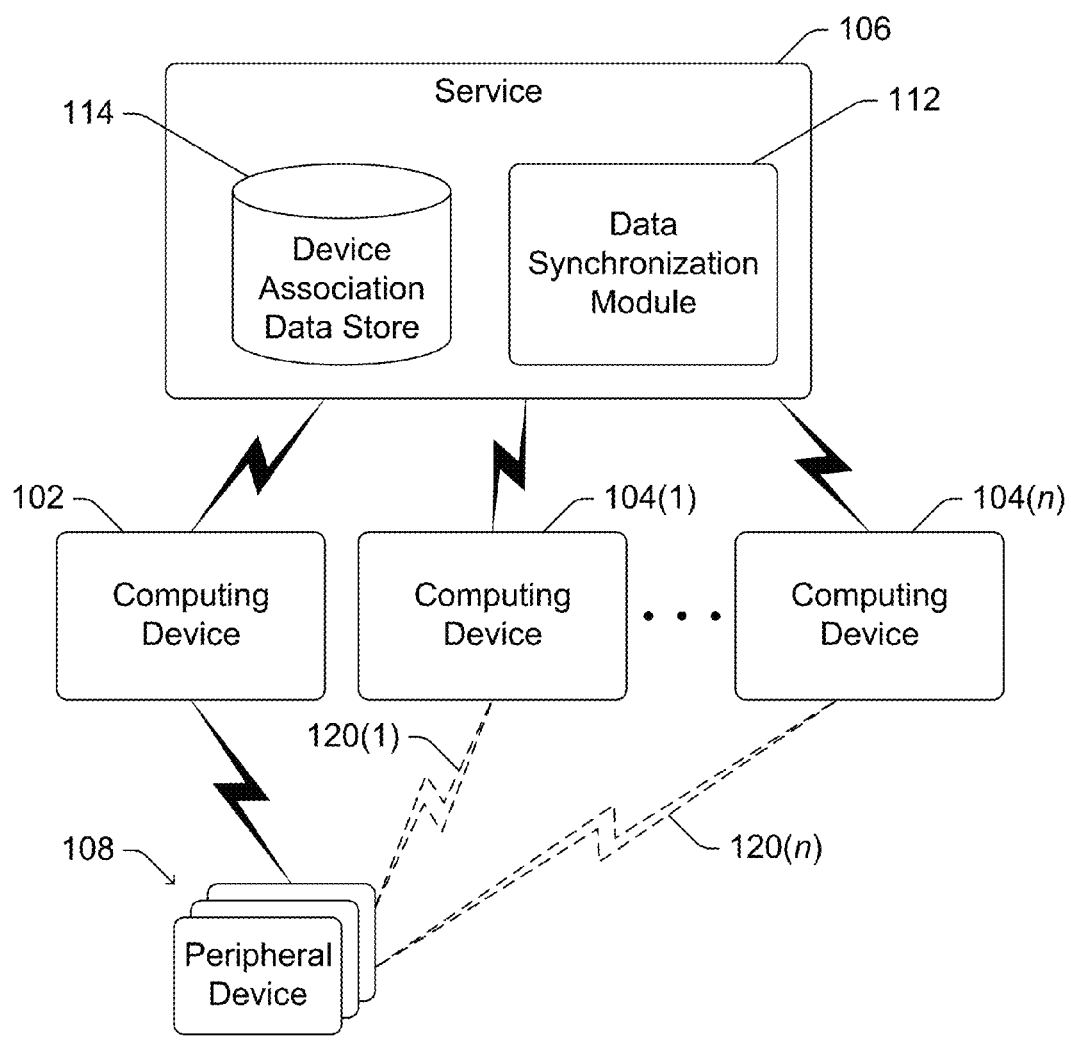
FIG. 1 illustrates an example system implementing the synchronizing device association data among computing devices in accordance with one or more embodiments.

FIG. 1 illustrates an example system 100 implementing the synchronizing device association data among computing devices in accordance with one or more embodiments. System 100 includes a computing device 102 and multiple (n) computing devices 104(1), . . . , 104(n) that can communicate with a service 106. Computing devices 102, 104 can communicate with the service 106 via any of a variety of different networks, including the Internet, a local area network (LAN), a phone network, an intranet, other public and/or proprietary networks, combinations thereof, and so forth. Computing devices 102, 104 can additionally or alternatively communicate with the service 106 via communication channels other than a network, such as any of a variety of wired and/or wireless connections. It should be noted that the system 100 can include any number of computing devices of the same or different types communicating with the service 106.

Each computing device 102, 104 can be a variety of different types of devices, and the computing devices 102 and 104 can be the same or different types of devices. For example, each computing device 102, 104 can be a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, a wearable computer, and so forth. Thus, each computing device 102, 104 may range from a full resource device with substantial memory and processor resources (e.g., personal computers, game consoles) to a low-resource device with limited memory and/or processing resources (e.g., traditional set-top boxes, hand-held game consoles).

Similar to the discussion of computing devices 102 and 104, the service 106 can be implemented using one or more of a variety of different types of devices, ranging from full resource devices with substantial memory and processor resources to low-resource devices with limited memory and/or processing resources. The service 106 can be remote from the computing devices 102, 104 (e.g., accessed via the Internet) or local to the computing devices 102, 104 (e.g., accessed via a LAN). Thus, the service 106 can be hosted by one or more devices local to the computing devices 102, 104 (e.g., on premise, such as in the same building or office), or hosted by one or more devices remote from the computing devices 102, 104 (e.g., off premise, such as in another building, city, or country).

A user of the computing device 102 has a user account associated with the service 106. The user can log into his or her account from the computing device 102 in any of a variety of different manners, such as by way of a user name and password, digital certificate, and so forth. While logged into his or her account, the computing device 102 synchronizes device association data with the service 106, as discussed in more detail below.

A user of the computing device 102 can connect to one or more peripheral devices 108, also referred to as associating the computing device 102 with the one or more peripheral devices 108. Associating the computing device 102 with a peripheral device 108 can include installing the peripheral device 108 on the computing device 102. Installing a peripheral device includes installing resources (e.g., drivers) and setting appropriate properties for the computing device 102 and/or peripheral device 108 to establish a communication connection between the computing device 102 and the peripheral device 108 (e.g., pairing the peripheral device 108 with the computing device 102). Thus, installing a peripheral device includes making the peripheral device 108 available for use by the computing device 102.

Associating the computing device 102 with a peripheral device 108 can also include adding to the computing device 102 information indicating how to access the peripheral device 108 (e.g., establish a communication connection between the computing device 102 and the peripheral device 108), which device functions the peripheral device has, how to use or access the device functions, combinations thereof, and so forth. Thus associating the computing device 102 with a peripheral device 108 can include making a peripheral device 108 available for use by the computing device 102 without installing the peripheral device 108 on the computing device 102.

Peripheral devices 108 refer to devices that can connect to a computing device, providing functionality not provided by the computing device, enhancing functionality provided by the computing device, replacing functionality provided by the computing device, and so forth. For example, peripheral devices can be output devices (e.g., printers, speakers, etc.), input devices (e.g., scanners, microphones, keyboards, etc.), data storage devices, other computing devices (e.g., smart phones, print servers, etc.), and so forth. Peripheral devices can be local devices (e.g., communicating with the computing device via a wired or wireless connection), or remote devices (e.g., communicating with the computing device via a network). Peripheral devices can also be other computing devices, such as a smart phone.

In one or more embodiments, peripheral devices are devices implemented in housings separate from the computing devices 102, 104. The peripheral devices are physically separate from and external to the computing devices 102, 104, but can still communicate with the computing devices 102, 104 and optionally be physically connected to the computing devices 102, 104. The peripheral devices are hardware devices, and can include software and/or firmware. For example a peripheral device (e.g., a shared printer) can be a logical unit including both a print server (implemented in software) and a physical printer.

The device association data is various data that can be used as part of the process of associating a computing device with a peripheral device. The device association data is thus also referred to as corresponding to a peripheral device. The device association data for a peripheral device is the data used to connect to a peripheral device, such as a network or media access control (MAC) address, a network address for a shared printer on a print server, security or authentication data such as a certificate or personal identification number (PIN), and so forth. The device association data may also include additional data regarding the peripheral device and/or the device association data, such as a name or identifier of the peripheral device, a type of the peripheral device, an identifier of a driver associated with the peripheral device, whether the peripheral device is already installed on the computing device 102, and so forth. The device association data for a peripheral device thus describes how to connect to the peripheral device. The device association data is maintained by the computing device 102 so that the computing device 102 can subsequently access the peripheral device (e.g., after being power down and restarted) without re-installing the peripheral device.

A peripheral device may also have associated device use data (also referred to as user preference data) that describes how a user desires or prefers to use the peripheral device. The device use data for a peripheral device can specify, for example, particular settings or values for the peripheral device that the user prefers (e.g., a particular volume level for a speaker, a particular print setting (e.g., duplex mode, economy mode to conserve ink or toner, etc.) for a printer, a particular scan resolution for a scanner, and so forth). The device use data can be included as part of the device association data and thus synchronized as part of the device association data as discussed in more detail below. Alternatively, the device use data can be separate from the device association data, but synchronized analogous to (and optionally together with) the device association data.

The device use data can be synchronized for peripheral devices that are associated with a computing device due to being automatically installed, manually installed, or connected to by a computing device without being installed. Thus, when a peripheral device is newly associated with a computing device, the device use data from other computing devices can be received and used on the computing device, and the user has his or her desired settings for the peripheral device automatically set on the computing device. Similarly, changes to the device use data made on one computing device are synchronized with the other computing devices, analogous to the device association data.

A peripheral device 108 can be manually associated with the computing device 102, such as by installing the peripheral device 108 on the computing device 102 manually, independent of the service 106 (e.g., not obtaining the device association data from the service 106). To associate a peripheral device 108 with the computing device manually, the peripheral device is discovered or identified using any of a variety of mechanisms, such as a directory service, multicast discovery over a network, Universal Plug and Play (UPnP) networking protocols, coupling to the peripheral device locally (e.g., using a Universal Serial Bus (USB) or wireless USB protocol), web services on devices, other public and/or proprietary protocols, and so forth. The device association data can be obtained in various manners based on the mechanism used to discover or identify the peripheral device, such as obtaining the device association data from the service used to discover or identify the peripheral device, from the peripheral device itself, and so forth.

While logged into his or her account, the computing device 102 synchronizes device association data with the service 106. The computing device 102 synchronizing device association data refers to the computing device 102 obtaining device association data from the service 106, and providing device association from the computing device 102 to the service 106. The service 106 can include a data synchronization module 112 and a device association data store 114. The data synchronization module 112 manages synchronization of device association data with the computing devices 102, 104, storing received device association data in the device association data store 114. The device association data store 114 of the service 106 thus includes device association data that is provided to the service 106 as a result of peripheral devices 108 being associated with various ones of computing devices 102, 104, and is synchronized across the computing devices 102, 104.

Alternatively, the service 106 may simply include the device association data store 114, and the computing devices 102, 104 can retrieve data from the device association data store 114 and determine any changes to the device association data, as discussed in more detail below, without using a synchronization module 112. The service 106 can support push models (e.g., where the service 106 provides data from the service 106 to one or more computing devices 102) and/or pull models (e.g., where the computing devices 102 poll the service 106 or otherwise access the service 106 to request or retrieve the data from the service 106).

When the user is logged into his or her account from a computing device 102 or 104, device association data for newly associated peripheral devices 108 on the computing device is communicated to the service 106 and stored in the device association data store 114. Similarly, indications of de-associated (e.g., deleted or uninstalled) peripheral devices 108 can be communicated to the service 106 and the indicated device association data deleted from the device association data store 114. De-associating a peripheral device 108 refers to uninstalling the device (e.g., deleting or otherwise removing drivers or other resources, clearing or resetting properties for the computing device 102 and/or peripheral device 108, etc.), or otherwise clearing or resetting values used by the computing device 102 to communicate with the peripheral device 108. In one or more embodiments, in order to manage conflicts between computing devices which may have different data, each computing device 102, 104 and the service 106 maintain timestamps (e.g., dates and/or times) of when the data was last modified (by or from the perspective of the computing device or service) in order to resolve conflicts and determine which data is the data to be used (e.g., the most recent timestamp for when the data was last modified).

Device association data received from one computing device 102, 104 is stored in the device association data store 114 and provided to the other computing device 102, 104. The data can be provided to or otherwise obtained by the other computing device 102, 104 at different times and/or in response to different events, such as when the user logs into his or her user account from the other computing device 102, 104, at regular or irregular intervals (e.g., pushed to the other computing device 102, 104 by the service 106, retrieved by the other computing device 102, 104, and so forth).

Thus, when a new peripheral device 108 is associated with the computing device 102, device association data for the new peripheral device 108 is communicated to the service 106 and stored in the device association data store 114. When the user subsequently logs into his or her account from the computing device 104, the device association data for the new peripheral device 108 is communicated from the service 106 to the computing device 104, and the new peripheral device 108 is automatically associated with the computing device 104 (illustrated by the dashed connection 120). It should be noted that the new peripheral device is automatically associated with the computing device 104 if the new peripheral device can be automatically associated with the computing device 104. Situations can arise in which the new peripheral device cannot be automatically associated with the computing device 104, in which case the peripheral device is not automatically associated with the computing device 104 as discussed in more detail below. Similarly, if an additional peripheral device were to be associated with the computing device 104, device association data for that additional peripheral device is provided to the computing device 102 and the additional peripheral device is automatically associated with the computing device 102 (assuming the additional peripheral device can be automatically associated with the computing device 102).

Figure 2:
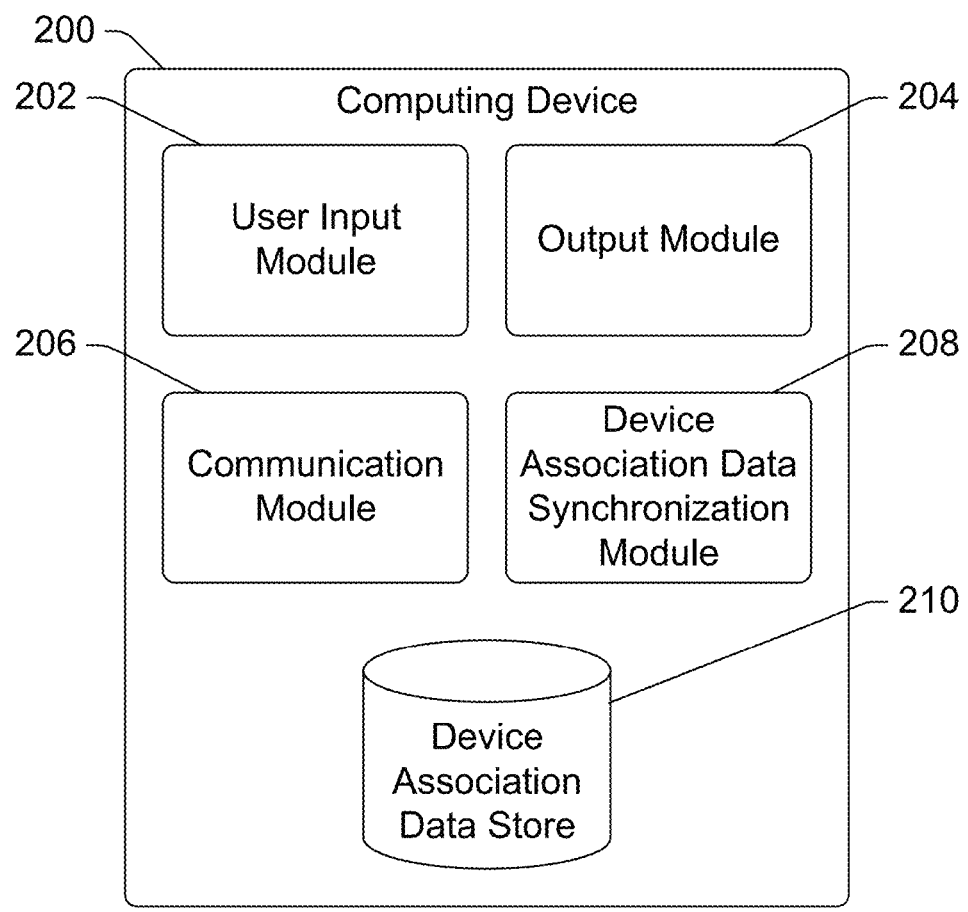
FIG. 2 is a block diagram illustrating an example computing device implementing the synchronizing device association data among computing devices in accordance with one or more embodiments.

FIG. 2 is a block diagram illustrating an example computing device 200 implementing the synchronizing device association data among computing devices in accordance with one or more embodiments. The computing device 200 can be, for example, a computing device 102 or 104 of FIG. 1. The computing device 200 includes a user input module 202, an output module 204, a communication module 206, a device association data synchronization module 208, and a device association data store 210.

The user input module 202 receives user inputs from a user of the computing device 200. User inputs can be provided in a variety of different manners, such as by pressing one or more keys of a keypad or keyboard of the device 200, pressing one or more keys of a controller (e.g., remote control device, mouse, track pad, etc.) of the device 200, pressing a particular portion of a touchpad or touchscreen of the device 200, making a particular gesture on a touchpad or touchscreen of the device 200, and/or making a particular gesture on a controller (e.g., remote control device, mouse, track pad, etc.) of the device 200. User inputs can also be provided via other physical feedback input to the device 200, such as tapping any portion of the device 200, an action that can be recognized by a motion detection or other component of the device 200 (such as shaking the device 200, rotating the device 200, bending or flexing the device 200, etc.), and so forth. User inputs can also be provided in other manners, such as via voice or other audible inputs to a microphone, via motions of hands or other body parts observed by an image capture device, and so forth.

The output module 204 generates, manages, and/or outputs content for display, playback, and/or other presentation. This content can be created by the output module 204 or obtained from other modules of the computing device 200. This content can be, for example, a display or playback portion of a user interface (UI), prompts for input, and so forth. The content can be displayed or otherwise played back by components of the computing device 200 (e.g., speakers, interactive display devices, etc.). Alternatively, the output module 204 can generate one or more signals that are output to other devices or components (e.g., speakers, display devices, etc.) that are separate from the computing device 200.

The communication module 206 manages communication with a service such as the service 106 of FIG. 1, as well as peripheral devices such as peripheral devices 108 of FIG. 1. The management of communication refers to sending data obtained from other modules of the computing device 200 to a target device, and providing data received from other devices to the appropriate modules of the computing device 200.

Device association data store 210 maintains copies of device association data for devices manually associated with the computing device 200 as well as device association data for devices received from the service 106. The device association data for devices received from the service 106 can be automatically associated with the computing device 200, or alternatively can be received and maintained in the device association data store 210 without being associated with the computing device 200 as discussed in more detail below.

The device association data synchronization module 208 manages the sending of device association data to the service 106. When a new peripheral device is manually associated with the computing device 200 while a user is logged into his or her account on the service 106, the device association data for the peripheral device is maintained in the device association data store 210 and the device association data synchronization module 208 sends a copy of the device association data to the service 106. If a new peripheral device is manually associated with the computing device 200 while a user is not logged into his or her account on the service 106, the device association data synchronization module 208 can send a copy of the device association data for the new peripheral device to the service 106 when the user subsequently logs into his or her account from the computing device 200. Alternatively, the device association data synchronization module 208 may not send a copy of the device association data for a new peripheral device to the service 106 if the new peripheral device is manually associated with the computing device 200 while a user is not logged into his or her account on the service 106.

The device association data synchronization module 208 also manages the receiving of device association data from the service 106. When a user logs into his or her account on the service 106 from the computing device 200, the service 106 sends a copy of device association data for any new peripheral devices for which the service 106 has a copy but the computing device 200 does not have a copy (e.g., for peripheral devices that were manually associated with another computing device). The service 106 can also send a copy of other information about the device association data received from the service 106, such as timestamp information, user information, and so forth. The device association data synchronization module 208 maintains a copy of the device association data received from the service 106 in the device association data store 210. The device association data synchronization module 208 also retains the information about the device association data received from the service 106, such as timestamp information, user information, and so forth, to resolve conflicts and perform other functions. The device association data synchronization module 208 also automatically associates the computing device 200 with the peripheral device corresponding to that device association data, assuming the peripheral device can be automatically associated with the computing device 200 as discussed in more detail below.

Similarly, other changes to device association data can be sent to the service 106 and/or received from the service 106 analogous to the sending of device association data for a new peripheral device. For example, if device association data for a peripheral device is changed (e.g., the print server name changes, security or authentication data changes, etc.), an indication of the change can be sent to the service 106, which sends the indication to other computing devices when the user logs into his or her account from those other computing devices. Thus, the change in device association data is automatically synchronized to those other computing devices. By way of another example, if a peripheral device is deleted (e.g., uninstalled or de-associated) on one computing device, an indication of the deletion can be sent to the service 106, which sends the indication to other computing devices when the user logs into his or her account from those other computing devices. Thus, the peripheral device is automatically de-associated from (e.g., uninstalled from) those other computing devices. Alternatively, indications of deleted peripheral devices may not be sent to the service 106, and instead the user manually de-associates the peripheral devices on the computing devices he or she desires. It should be noted that even if a peripheral device is de-associated from a computing device, the corresponding device association data can remain on the computing device (or alternatively can be deleted).

Determinations of what device association data changes (e.g., new device association data, indications of deletions or other changes) have been made, and thus what device association data changes need to be synchronized to other computing devices, can be performed in various manners. The service 106 and/or the computing device 200 can be relied on to perform the determination. For example, the computing device 200 can determine what device association data changes have been made and send an indication of the device association data changes that have been made. By way of another example, the computing device 200 can send a record of substantially all device association data in device association data store 210 (e.g., a snapshot of current device association data for the computing device 200) to the service 106, and the service 106 can compare the record of substantially all device association data to a record of device association data associated maintained by the service 106 to determine what device association data changes have been made.

By way of yet another example, the computing device 200 can send a record of substantially all device association data in device association data store 210 (e.g., a snapshot of current device association data for the computing device 200) to the service 106, and the service 106 can maintain a copy of this record. The record can then be sent by the service 106 to other computing devices when the user logs into his or her user account from those other computing devices, and those other computing devices can compare the record of substantially all device association data to their records of device association data to determine what device association data changes have been made. The record can alternatively be sent by the service 106 to other computing devices at other times or in response to other events, such as the service 106 pushing the record to the other computing devices at regular or irregular intervals, the other computing devices requesting the record (e.g., polling the service 106) at regular or irregular intervals, and so forth.

Figure 3:
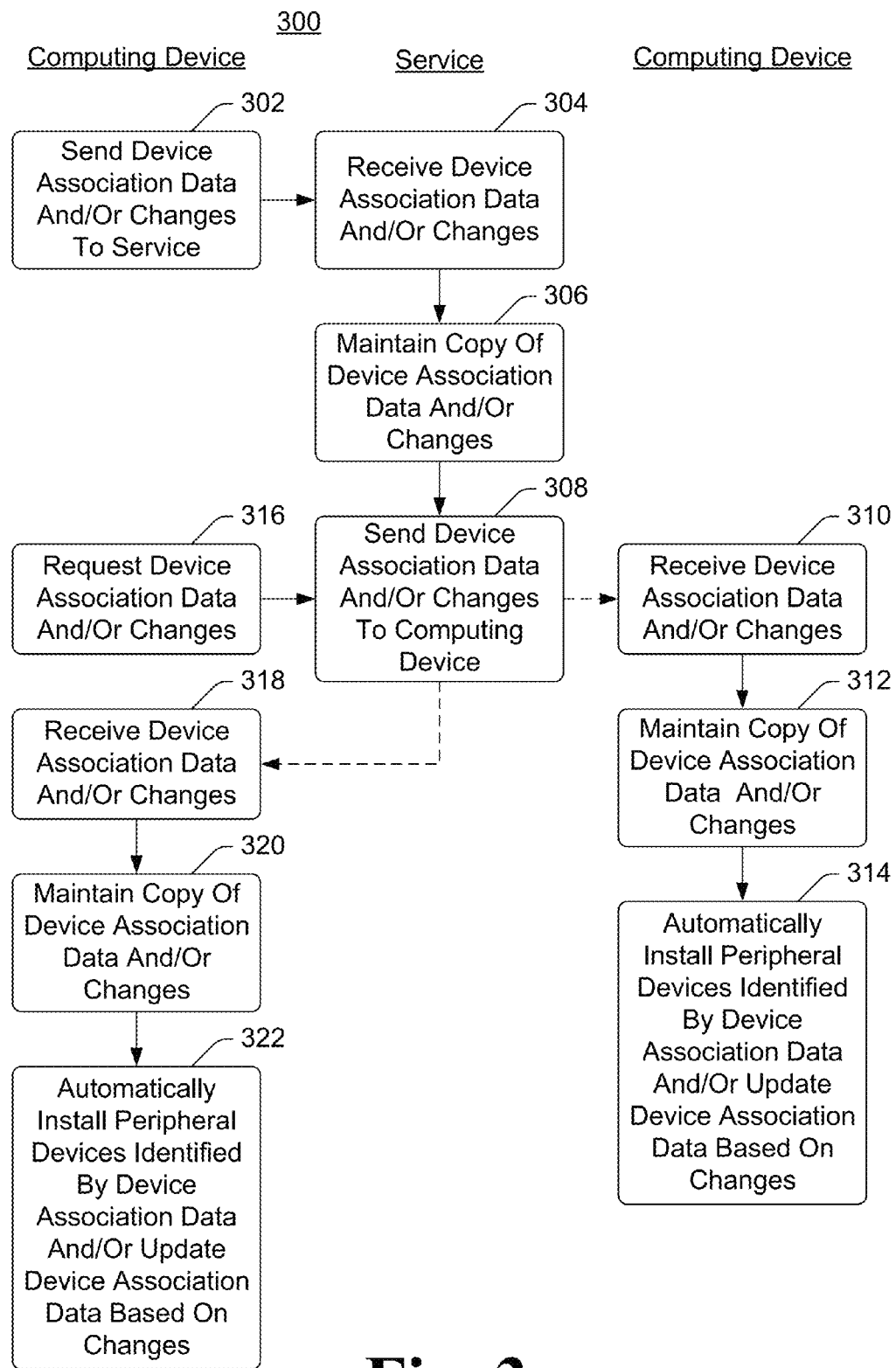
FIG. 3 is a flowchart illustrating an example process for synchronizing device association data among computing devices in accordance with one or more embodiments.

FIG. 3 is a flowchart illustrating an example process 300 for synchronizing device association data among computing devices in accordance with one or more embodiments. Process 300 can be implemented in software, firmware, hardware, or combinations thereof. Process 300 is illustrated with three columns: acts of process 300 illustrated in the left column are carried out by one computing device (e.g., a computing device 102 or 104 of FIG. 1, or a computing device 200 of FIG. 2), acts of process 300 illustrated in the right column are carried out by another computing device (e.g., a computing device 102 or 104 of FIG. 1, or a computing device 200 of FIG. 2), and acts of process 300 illustrated in the middle column are carried out by a service (e.g., service 106 of FIG. 1). Process 300 is shown as a set of acts and is not limited to the order shown for performing the operations of the various acts. Process 300 is an example process for synchronizing device association data among computing devices; additional discussions of synchronizing device association data among computing devices are included herein with reference to different figures.

In process 300, device association data and/or device association data changes are sent to a service (act 302), which receives the device association data and/or device association data changes (act 304) and maintains a copy of the device association data and/or device association data changes (act 306). The service maintains a copy of the device association data as associated with a user account, which is the user account that the user is logged into when the device association data is sent to the service in act 302. For device association data changes, the service can replace the previous device association data (the device association data being changed) with the newly received device association data.

The device association data and/or device association data changes are sent by the service to a computing device (act 308). The device association data and/or device association data changes can be sent to and received by (act 310) a computing device that is different than the computing device that sent the device association data and/or device association data changes in act 302. The device association data and/or device association data changes can be sent in act 308 in response to a request from the computing device for the device association data and/or device association data changes, or alternatively the service may push or otherwise provide the device association data and/or device association data changes to the computing device in act 308 independent of any request for the device association data and/or device association data changes being received by the service. The computing device maintains a copy of the device association data and/or device association data changes (act 312). The computing device also automatically associates with the computing device those peripheral devices identified by the device association data that can be automatically associated with the computing device and/or updates device association data in accordance with the device association data changes (act 314).

Additionally or alternatively, a request to receive device association data and/or device association data changes can be sent (act 316) to the service by the same computing device as previously sent the device association data and/or device association data changes in act 302. In response to the request sent in act 316, the service sends the device association data and/or device association data changes associated with the user account to the computing device (act 308). The computing device receives the device association data and/or device association data changes (act 318), and maintains a copy of the device association data and/or device association data changes (act 320). The computing device also automatically associates with the computing device those peripheral devices identified by the device association data that can be automatically associated with the computing device and/or updates device association data in accordance with the device association data changes (act 322). Alternatively, rather than a request being sent in act 316, the service may push or otherwise provide the device association data and/or device association data changes associated with the user account to the computing device in act 318 independent of any request for the device association data and/or device association data changes being received by the service.

Thus, device association data and/or device association data changes can be synchronized to other computing devices, and peripheral devices automatically associated with those other computing devices. Additionally or alternatively, the device association data can be returned from the service to the computing device that sent the device association data to the service. Thus, a computing device can back up its device association data information to the service, and subsequently receive the device association data and have the peripheral devices automatically re-associated with the computing device (e.g., if the computing device has a new hard drive, if an operating system is being reinstalled on the computing device, etc.).

It should be noted that the device association data is associated with a user account on the service, and thus that the sending and receiving of device association data is performed while the user is logged into his or her user account. The sending and receiving for different computing devices in process 300 can thus be performed at different times. For example, the device association data can be sent to the service in act 302 when the user is logged into his or her user account from one computing device, and then subsequently sent from the service to another computing device in act 308 when the user is later logged into his or her user account from that other computing device. It should also be noted that simultaneous processes 300 can be performed from different computing devices. For example, one computing device may be sending device association data to the service concurrently with another computing device receiving the device association data from the service, one computing device may be sending device association data to the service concurrently with another computing device sending device association data to the service, and so forth.

In the example process 300, the device association data is shown as being received by the service from a computing device. Alternatively, the device association data can be received from other sources. For example, in one or more embodiments a peripheral device can itself provide the device association data for the peripheral device to the service. E.g., a peripheral device may be a smart phone that is able to send its own device association data to the service. Thus, a peripheral device is able to provide its device association data to the service, which synchronizes the device association data to computing devices from which the user logs into his or her account, and the peripheral device is automatically associated with those computing devices without the user ever having manually associated the peripheral device with a computing device. Similarly, a peripheral device (such as a smart phone peripheral device) may also receive device association data from the service, which may contain user preference data on how the specific user desires or prefers to use the peripheral device, and the peripheral device can use that preference data (e.g., by setting the appropriate configuration values or other device settings in accordance with the user preference data).

Figure 4:
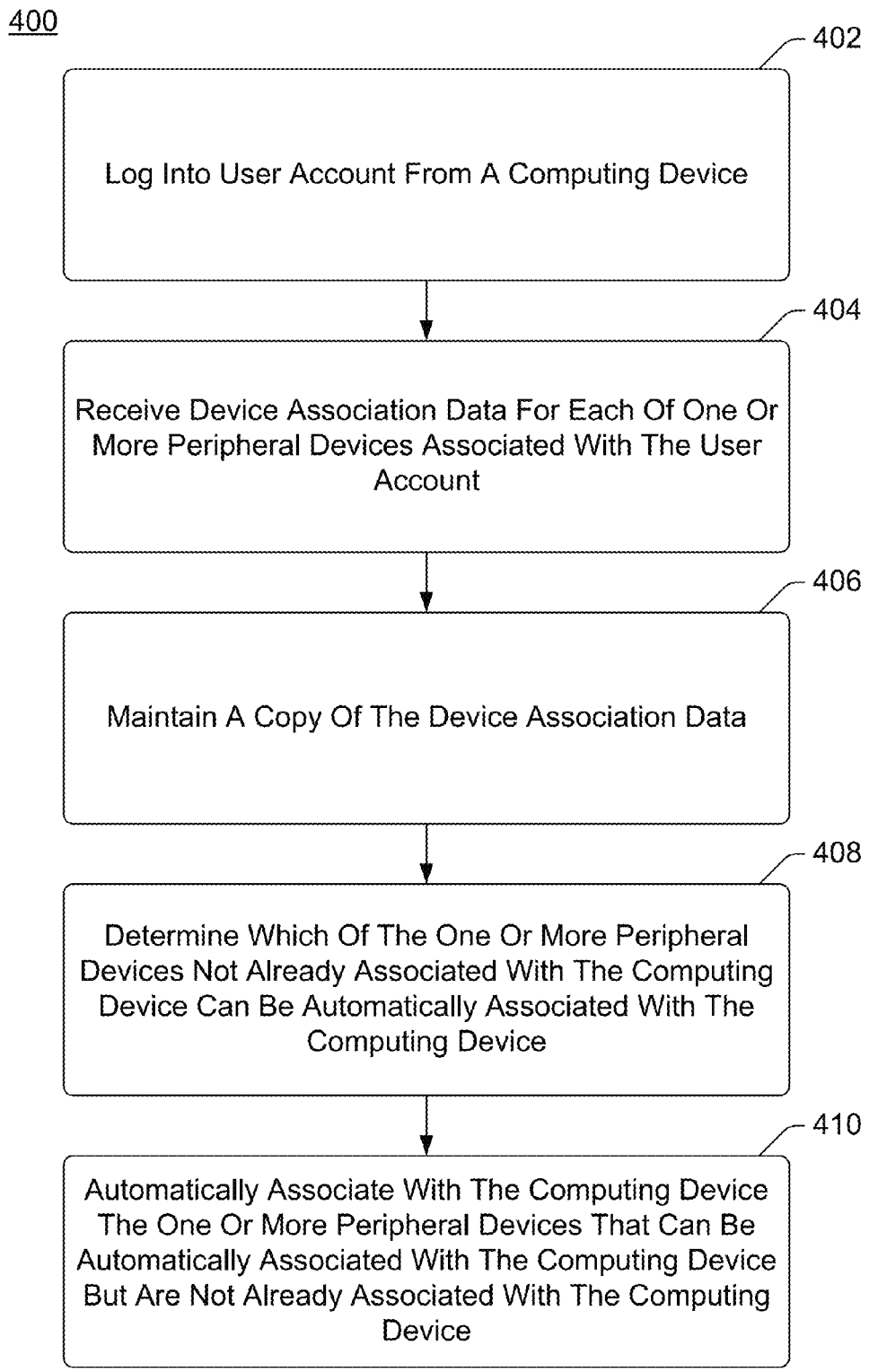
FIG. 4 is a flowchart illustrating an example process for automatically associating peripheral devices with a computing device in accordance with one or more embodiments.

FIG. 4 is a flowchart illustrating an example process 400 for automatically associating peripheral devices with a computing device in accordance with one or more embodiments. Process 400 is carried out by a computing device, such as a computing device 102 or 104 of FIG. 1, or a computing device 200 of FIG. 2, and can be implemented in software, firmware, hardware, or combinations thereof. Process 400 is shown as a set of acts and is not limited to the order shown for performing the operations of the various acts. Process 400 is an example process for automatically associating peripheral devices with a computing device; additional discussions of a automatically associating peripheral devices with a computing device are included herein with reference to different figures.

In process 400, the user account is logged into (act 402) from the computing device implementing process 400. Device association data for each of one or more peripheral devices associated with the user account is received (act 404). The device association data received can take different forms, such as being substantially all of the device association data received, device association data for new peripheral devices installed by other computing devices, and so forth. The device association data can be received at different times, such as shortly after the user account is logged onto, some amount of time after the user account is logged onto (e.g., after a threshold amount of time has elapsed, after a threshold amount of other data or higher priority data has been received from the service, etc.), based on other events (e.g., a change to the device association data stored in the service), and so forth.

A copy of the received device association data is maintained on the computing device (act 406). Additionally, which of the one or more peripheral devices corresponding to the received device association data that are not already associated with the computing device but can be associated with the computing device are determined (act 408). The one or more peripheral devices determined in act 408 as being able to be associated with the computing device but not currently associated with the computing device are automatically associated with the computing device (act 410). By automatically associating the peripheral devices with the computing device, the peripheral devices can be subsequently accessed by the computing device as if they were manually associated with the computing device (e.g., manually installed on the computing device), although the user need not manually associate the peripheral devices with computing device (e.g., need not manually install the peripheral devices).

The determination of which peripheral devices are already associated with the computing device can be determined in a variety of different manners, such as by comparing an identifier of the peripheral device included in the device association data with identifiers of peripheral devices already associated with the computing device, by assuming that all device association data received from the server is for peripheral devices not already associated with the computing device (and thus none of the peripheral devices corresponding to the received device association data are already associated with the computing device), and so forth.

The determination of which peripheral devices can be automatically associated with the computing device can also be determined in different manners. In one or more embodiments, various rules (or other criteria) are applied to identify peripheral devices that cannot be automatically associated with the computing device. Such rules can reside in various locations, such as on the computing device, stored as part of the device association data that computing devices receive from the service, and so forth. A peripheral device can thus be automatically associated with the computing device unless one or more rules indicate the peripheral device is not to be automatically associated with the device.

It should also be noted that if a peripheral device is not to be automatically associated with a computing device, the device association data for the peripheral device can still be used to facilitate discovery of the peripheral device and/or association of the peripheral device when manually associating the peripheral device with the computing device. For example, a peripheral device may have a security code or other information that is persisted in the device association data, and the user need not enter or otherwise provide that information again if he or she chooses to connect to the peripheral device by manually installing it. By way of another example, the existence of the peripheral device may be displayed on a peripheral device selection or other configuration screen, such as in a different form (e.g., a different color, shadowed or lighter, etc.) to indicate that the peripheral device exists but is not associated with the computing device.

The rules to identify peripheral devices that cannot be automatically associated with the computing device can include a peripheral device driver availability rule. The peripheral device driver refers to software (and/or firmware) and data that is used by a computing device to communicate with the peripheral device. In one or more embodiments, a computing device receiving device association data corresponding to a peripheral device may not be able to install peripheral device drivers, or may not be able to install the driver for that peripheral device. In such embodiments, the determination is made that the peripheral device cannot be associated with the computing device.

Additionally, some peripheral device drivers are downloaded from a source (e.g., another device or service), such as via a network, from magnetic or optical disk, form a flash drive or other solid state drive, from another location on the computing device itself, and so forth. These peripheral device drivers may be digitally signed as being verified, may be obtained from a verified source, or may be otherwise verifiable. In one or more embodiments, the determination is made that a peripheral device driver cannot be installed on the computing device if the peripheral device driver is not verified (e.g., is not digitally signed by an authority trusted by the computing device, is not from a verified source, etc.). However, the user can optionally be prompted to authorize installation of the peripheral device using the obtained peripheral device driver. Various user inputs can be received to authorize installation of the peripheral device, such as selection of a "yes" or "install" option. If the user input indicates that installation of the peripheral device is authorized, then the peripheral device is associated with the computing device as if being automatically associated with the computing device (the user need not take additional actions to associate the peripheral device with the computing device as if he or she were manually associating the peripheral device with the computing device).

Additionally, some peripheral device drivers are designed using different models (e.g., formats or protocols used by the drivers) that may be identified by version numbers. A peripheral device may have drivers using different ones of these models. In one or more embodiments, the determination is made that a peripheral device driver cannot be installed on the computing device if the peripheral device driver is not a particular model, is not at least a particular version of the driver model, and so forth. However, the user can optionally be prompted to authorize installation of the peripheral device using the obtained peripheral device driver despite the obtained driver not being the particular model, at least the particular version of the driver model, and so forth. Various user inputs can be received to authorize installation of the peripheral device, such as selection of a "yes" or "install" option. If the user input indicates that installation of the peripheral device is authorized, then the peripheral device is associated with the computing device as if being automatically associated with the computing device (the user need not take additional actions to associate the peripheral device with the computing device as if he or she were manually associating the peripheral device with the computing device).

The rules to identify peripheral devices that cannot be automatically associated with the computing device can include a specified device rule. Some peripheral devices can be associated with a computing device in a manner specific to the individual computing device, and the device association data includes that specific manner. For example, a peripheral device (e.g., a Bluetooth device) may be installed on a computing device and have device association data that includes the MAC address of the computing device on which the peripheral device is installed. In one or more embodiments, a check is made as to whether the device association data includes data specifying a particular computing device. If the computing device that receives the device association data is the computing device specified by the device association data, then the peripheral device can be automatically associated with the computing device. However, if the computing device that receives the device association data is not the computing device specified by the device association data, then the peripheral device cannot be automatically associated with the computing device. Thus, such a peripheral device could be automatically re-associated with the computing device from which the device association data was originally sent (e.g., backing up the device association data), but not automatically associated with other computing devices.

The rules to identify peripheral devices that cannot be automatically associated with the computing device can include a domain or network rule. Different peripheral devices can be located on particular networks or domains that are only accessible to particular computing devices (e.g., computing devices with access to the network, computing devices that are part of the same domain, and so forth). In one or more embodiments, a check is made as to whether the device association data indicates that the peripheral device is part of a domain or located on a network that the computing device that received the device association data does not currently have access to. Whether the peripheral device is part of a domain or located on a network that the computing device does not currently have access to can be determined in various manners, such as by comparing the domain or network that the peripheral device is on (as identified in the device association data) to a record (e.g., maintained by an operating system of the computing device) that the computing device is currently on to determine if they are the same, by attempting to access the peripheral device and checking whether the attempt is successful, and so forth. If the peripheral device is part of a domain or located on a network that the computing device does not currently have access to, then the determination is made that the peripheral device cannot be automatically associated with the computing device.

Although the determination is made that the peripheral device cannot be automatically associated with the computing device, this determination is made due to the peripheral device currently being inaccessible. Thus, the peripheral device can be referred to as being capable of being associated with the computing device but cannot be automatically associated with the computing device. The peripheral device or device association data is marked or a record is made of such peripheral device or device association data to indicate to the computing device that it may subsequently have access to the domain or network on which the peripheral device is located and thus is to be associated with the computing device. For example, the computing device may be a laptop computer that the user is running at home when process 400 is performed and thus does not have access to his or her work domain or network, but may later be taken to work and join the domain or network on which the peripheral device is located. In such situations, the peripheral device may be automatically associated with the device at a later time (e.g., when the user takes his or her device to work and the computing device detects that it has joined the domain or network on which the peripheral device is located), or the user may be prompted at a later time to indicate whether re-checking the ability to automatically associate the peripheral device with the computing device is desired. The device association data synchronization module 208 of FIG. 2 may check at regular or irregular intervals, or in response to particular events (such as the computing device joining a particular domain), whether the peripheral device is part of a domain or located on a network that the computing device does currently have access to.

The rules to identify peripheral devices that cannot be automatically associated with the computing device can include an association reason rule. In some situations, peripheral devices can be associated with computing devices for particular reasons, such as an administrator action or group policy setting. In one or more embodiments, when a peripheral device is associated with a computing device in response to a command from an administrator or due to a group policy setting, a record is made in the device association data corresponding to that the peripheral device was associated with a computing device because of that command. A check is made by the computing device receiving the device association data as to whether the device association data indicates that the peripheral device was associated with a computing device because of such a command from an administrator or due to a group policy setting. If the peripheral device was associated with a computing device because of such a command from an administrator or due to a group policy setting, then the determination is made that the peripheral device cannot be automatically associated with the computing device receiving the device association data.

The rules to identify peripheral devices that cannot be automatically associated with the computing device can include an authentication rule. In some situations, certain authentication information, PINs, and so forth are not included in the device association data. Rather, user input is received at each computing device with which the peripheral device corresponding to such device association data is being associated. In one or more embodiments, a check is made by the computing device receiving the device association data as to whether certain data (such as credentials, PINs, etc.) used for associating the peripheral device is missing from the corresponding device association data. If certain data used for associating the peripheral device with a computing device is not included in the corresponding device association data, then the determination is made that the peripheral device cannot be automatically associated with the computing device.

However, the user can optionally be prompted to provide the certain data that is missing from the device association data. Various user inputs can be received to provide certain data, such as entering a PIN or authentication code on a keyboard, providing a digital certificate associated with the user, and so forth. In response to the user input providing the missing data, the peripheral device is associated with the computing device as if being automatically associated with the computing device (the user need not take additional actions to associate the peripheral device with the computing device as if he or she were manually installing the peripheral device).

In the discussion of the rules to identify peripheral devices that cannot be automatically associated with the computing device, reference is made to prompting the user for input (e.g., authorization to install a driver, a PIN or credentials, and so forth). This prompting can be performed at different times, such as at the time the determination is made that the peripheral device cannot be automatically associated with the device, in response to user selection of the peripheral device on a peripheral device management or configuration screen, and so forth.

Additionally, it should be noted that if a peripheral device is not automatically associated with a computing device, an indication can be displayed or otherwise presented to give the user feedback as to why the peripheral device was not automatically associated with the computing device (e.g., a peripheral device driver cannot be installed on the computing device, the computing device does not have the proper MAC address, and so forth). This prompting can be performed at different times, such as at the time the determination is made that the peripheral device cannot be automatically associated with the device, in response to user selection of the peripheral device on a peripheral device management or configuration screen, and so forth.

It should also be noted that in the illustrated example of process 400, a copy of the received device association data is maintained on the computing device regardless of whether the peripheral device corresponding to the device association data is automatically associated with the computing device in act 410. Alternatively, a copy of the device association data corresponding to a peripheral device may only be maintained on the computing device under certain circumstances, such as the peripheral device corresponding to the device association data being associated with the computing device, the device association data being marked as being capable of being associated with the computing device but cannot be automatically associated with the computing device, and so forth.

Figure 5:
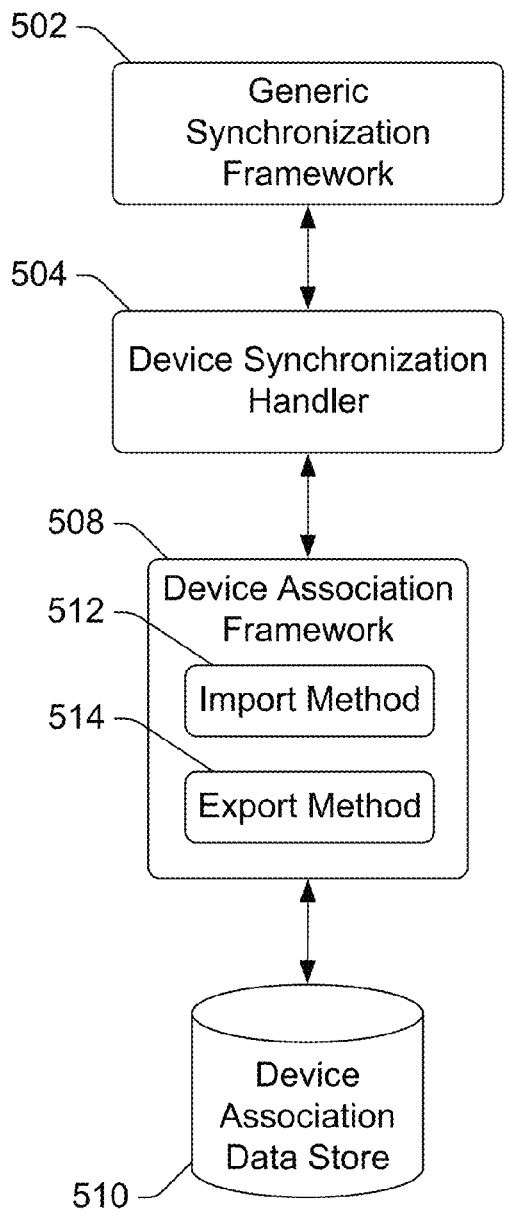
FIG. 5 is a block diagram illustrating an example model for implementing the techniques discussed herein in accordance with one or more embodiments.

FIG. 5 is a block diagram illustrating an example model 500 for implementing the techniques discussed herein in accordance with one or more embodiments. The model 500 can be used to implement, for example, the device association data synchronization module 208 of FIG. 2. The model 500 includes a generic synchronization framework 502, a device synchronization handler 504, a device association framework 508, and a device association data store 510.

Device association framework 508 manages device association data for particular peripheral device protocols (e.g., printers, Bluetooth devices, Web service providers, etc.), the device association data being maintained in device association data store 510 (which can be a device association data store 210 of FIG. 2). The device association framework 508 provides an import method 512 that is an interface allowing the device association framework 508 to receive device association data from device synchronization handler 504, and an export method 514 that is an interface allowing the device association framework 508 to send device association data to device synchronization handler 504. Device association framework 508 can include one or more modules to manage device association data for different peripheral device protocols.

In one or more embodiments, in order to populate the service 106 with a set of device association data for a user account, the generic synchronization framework 502 invokes the device synchronization handler 504 and asks the handler 504 to enumerate the data to synchronize. The synchronization handler 504 calls to the device association framework 508 and requests that the framework 508 export the collection of device association data that it has. The device association framework 508 reads from device association data store 510 to obtain its device association data, and provides the read device association data back to the device synchronization handler 504. The device synchronization handler 504 places the received device association data into a container of synchronized data and returns that container to the generic synchronization framework 502. The generic synchronization framework 502 provides the collection of synchronized data to the service 106.

In one or more embodiments, in order to provide changes made to the device association data on a computing device to the service 106, the device synchronization handler 504 registers for change events directly against the device association data 510. Alternatively, the device synchronization handler 504 can indicate to receive changes in other manners, such as by invoking an application programming interface (API) method exposed by the device association framework 508. In response to a change in the data store 510, the device synchronization handler 504 is notified, and the device synchronization handler 504 enumerates the current set of device association data from the device association framework 508. This enumeration allows the device synchronization handler 504 to obtain the details about what changed in the data store 510 without needing to understand the details of the underlying data store 510. The device association framework 508 reads from the device association data store 510 to obtain its device association data and returns its device association data (e.g., as device association data objects) to the device synchronization handler 504, which produces a container of synchronized settings including the device association data it receives and passes the container to the generic synchronization framework 502. The generic synchronization framework 502 provides the collection of synchronized data to the service 106.

In one or more embodiments, in order to record changes made to the device association data received from the service 106, the service 106 notifies the generic synchronization framework 502 about the change to the device association data and provides a new collection of substantially all synchronized settings to the generic synchronization framework 502. The generic synchronization framework 502 parses this collection and then calls the device synchronization handler 504 to handle the device association data that was received from the service 106. The device synchronization handler 504 enumerates the existing set of device association data so that it can determine the difference between the current local device association data and the device association data that was received from the service 106. The device synchronization handler 504 calls the device association framework 508 with the differences between the current local device association data and the device association data that was received from the service 106. The device association framework 508 retrieves the corresponding device association data from the device association data store 510. The set of device associations retrieved from the data store 510 is passed back up to the device synchronization handler 504. The device synchronization handler 504 determines if the set of data that changed affects the set of device association data that it manages; in other words, if the device association data remained the same but other synchronized data was changed then there is no change to the local state that the device synchronization handler 504 manages. If a peripheral device was added, then the device synchronization handler 504 calls the device association framework 508 with an import command to add the device association data, and the device association framework 508 to add the device association data to the data store 510. If a peripheral device was removed, then the device synchronization handler 504 calls the device association framework 508 with an unassociate or remove command, and the device association framework 508 removes the device association data from the data store 510. As a result of the device association data being added to or removed from the device association data store 510, the computing device associates or de-associates from the peripheral device.

The techniques discussed herein provide various usage scenarios. For example, a user can install peripheral devices that he or she likes to use on one of his or her computing devices, and have those peripheral devices automatically installed on all of his or her other computing devices. By way of another example, a user can purchase a new smart phone and have the smart phone communicate its device association data to the service. His or her new smart phone is then automatically installed on all of his or her computing devices without the user having to manually install the smart phone on any of those devices.

Various other modifications to the techniques discussed herein can be made. In one or more embodiments, device association data for peripheral devices installed on a computing device is automatically synchronized to various other computing devices from which the user logs into his or her account as discussed above. Alternatively, the user can be prompted (e.g., as part of the installation process) whether he or she desires to have a particular peripheral device synchronized to his or her other computing devices, and the device association data for the particular peripheral device is sent to the service and other computing devices only in response to a user input indicating that the particular peripheral device is to be synchronized.

Although particular functionality is discussed herein with reference to particular modules, it should be noted that the functionality of individual modules discussed herein can be separated into multiple modules, and/or at least some functionality of multiple modules can be combined into a single module. Various actions performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 6:
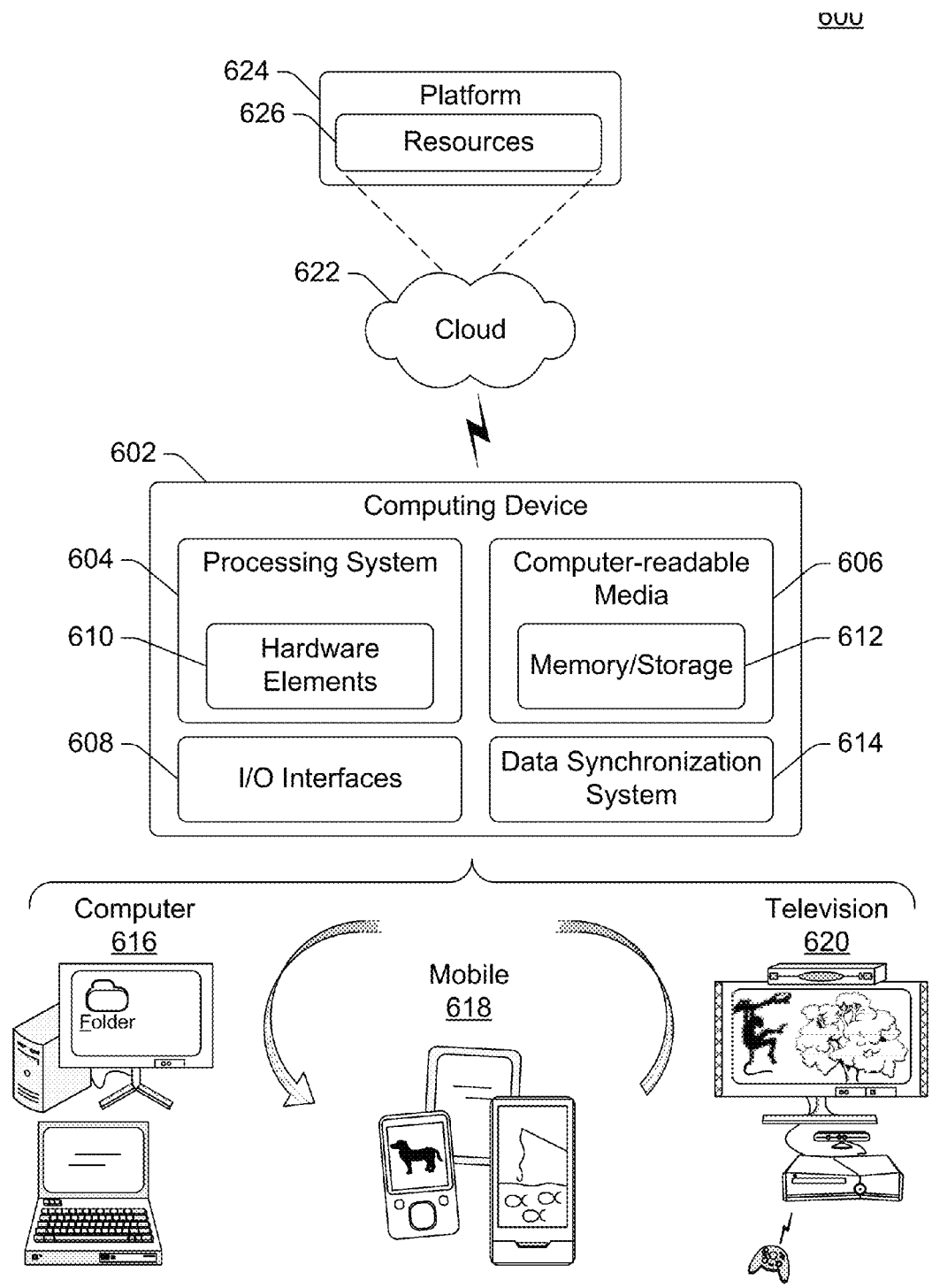
FIG. 6 illustrates an example system that includes an example computing device that is representative of one or more systems and/or devices that may implement the various techniques described herein.

FIG. 6 illustrates an example system generally at 600 that includes an example computing device 602 that is representative of one or more systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

Computing device 602 also includes a data synchronization system 614. Data synchronization system 614 provides various functionality for synchronizing device association data as discussed above. Data synchronization system 614 can implement, for example, data synchronization module 112 of FIG. 1, or device association data synchronization module 208 of FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television and/or set-top box device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 602 may assume a variety of different configurations, such as for computer 616, mobile 618, and television 620 uses. Each of these configurations includes devices that may have generally different constructs and capabilities, and thus the computing device 602 may be configured according to one or more of the different device classes. For instance, the computing device 602 may be implemented as the computer 616 class of a device that includes a personal computer, desktop computer, a multi-screen computer, laptop computer, netbook, and so on.

The computing device 602 may also be implemented as the mobile 618 class of device that includes mobile devices, such as a mobile phone, portable music player, portable gaming device, a tablet computer, a multi-screen computer, and so on. The computing device 602 may also be implemented as the television 620 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This functionality may also be implemented all or in part through use of a distributed system, such as over a "cloud" 622 via a platform 624 as described below.

The cloud 622 includes and/or is representative of a platform 624 for resources 626. The platform 624 abstracts underlying functionality of hardware (e.g., servers) and software resources of the cloud 622. The resources 626 may include applications and/or data that can be utilized while computer processing is executed on servers that are remote from the computing device 602. Resources 626 can also include services provided over the Internet and/or through a subscriber network, such as a cellular or Wi-Fi network.

The platform 624 may abstract resources and functions to connect the computing device 602 with other computing devices. The platform 624 may also serve to abstract scaling of resources to provide a corresponding level of scale to encountered demand for the resources 626 that are implemented via the platform 624. Accordingly, in an interconnected device embodiment, implementation of functionality described herein may be distributed throughout the system 600. For example, the functionality may be implemented in part on the computing device 602 as well as via the platform 624 that abstracts the functionality of the cloud 622.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving, from a service in response to a user logging into a user account of the service, device association data for each of one or more peripheral devices maintained and synchronized with the user account, the device association data for a peripheral device describing how to connect the peripheral device to a computing device;
   determining a first set of peripheral devices can be automatically made available for use with the computing device;
   obtaining, for at least one of a second set of peripheral devices that are not automatically made available for use with the computing device, additional credentials; and
   making available for use with the computing device the first set of peripheral devices and, using the obtained additional credentials, the at least one of the second set of peripheral devices.

2. The method as recited in claim 1, the obtaining comprising receiving the additional credentials as user input at the computing device.

3. The method as recited in claim 1, further comprising maintaining, on the computing device, a copy of device association data for each of the first set of peripheral devices as well as a copy of device association data for the at least one peripheral device of the second set of peripheral devices.

4. The method as recited in claim 1, the device association data for at least one peripheral device of the one or more peripheral devices having been provided to the service by an additional computing device as a result of the additional computing device connecting to the at least one peripheral device at the additional computing device.

5. The method as recited in claim 1, the device association data for at least one peripheral device of the one or more peripheral devices having been provided to the service by the computing device as a result of the computing device previously connecting to the at least one peripheral device.

6. The method as recited in claim 1, the device association data for at least one peripheral device of the one or more peripheral devices having been provided to the service by the at least one peripheral device.

7. The method as recited in claim 1, further comprising:
   receiving, from the service, device use data for at least one peripheral device of the one or more peripheral devices, the device use data for a peripheral device identifying particular settings for the peripheral device; and
   applying the particular settings to the at least one peripheral device installed on the computing device.

8. The method as recited in claim 1, further comprising:
   receiving, from the service, a change to device association data for at least one peripheral device of the one or more peripheral devices; and
   updating the device association data maintained on the computing device for the at least one peripheral device based on the change.

9. The method as recited in claim 1, further comprising:
   receiving, from the service, an indication that at least one peripheral device of the first set of peripheral devices or the at least one of the second set of peripheral devices has been deleted; and
   no longer making the at least one peripheral device available for use with the computing device.

10. A computing device comprising:
    a data store to store device association data for peripheral devices, the device association data for a peripheral device describing how the computing device is to connect to the peripheral device; and
    a device association data synchronization module configured to:
       receive, from a service in response to a user logging into a user account of the service, device association data for each of one or more peripheral devices maintained and synchronized with the user account;
       determine a first set of peripheral devices can be automatically made available for use with the computing device;
       obtain, for at least one of a second set of peripheral devices that are not automatically made available for use with the computing device, additional credentials; and
       make available for use with the computing device the first set of peripheral devices and, using the obtained additional credentials, the at least one of the second set of peripheral devices.

11. The computing device as recited in claim 10, the device association data synchronization module being configured to obtain the additional credentials by receiving the additional credentials as user input at the computing device.

12. The computing device as recited in claim 10, wherein the data store is further to store a copy of device association data for each of the first set of peripheral devices as well as a copy of device association data for the at least one peripheral device of the second set of peripheral devices.

13. The computing device as recited in claim 10, the device association data for at least one peripheral device of the one or more peripheral devices having been provided to the service by an additional computing device as a result of the additional computing device connecting to the at least one peripheral device at the additional computing device.

14. The computing device as recited in claim 10, the device association data for at least one peripheral device of the one or more peripheral devices having been provided to the service by the computing device as a result of the computing device previously connecting to the at least one peripheral device.

15. The computing device as recited in claim 10, the device association data for at least one peripheral device of the one or more peripheral devices having been provided to the service by the at least one peripheral device.

16. The computing device as recited in claim 10, the device association data synchronization module being further configured to:
    receive, from the service, device use data for at least one peripheral device of the one or more peripheral devices, the device use data for a peripheral device identifying particular settings for the peripheral device; and
    apply the particular settings to the at least one peripheral device installed on the computing device.

17. The computing device as recited in claim 10, the device association data synchronization module being further configured to:

receive, from the service, a change to device association data for at least one peripheral device of the one or more peripheral devices; and update the device association data stored in the data store for the at least one peripheral device based on the change.

18. The computing device as recited in claim 10, the device association data synchronization module being further configured to:

receive, from the service, an indication that at least one peripheral device of the first set of peripheral devices or the at least one of the second set of peripheral devices has been deleted; and no longer make the at least one peripheral device available for use with the computing device.

19. A computing device comprising:

one or more processors;

one or more computer-readable storage media having stored thereon multiple instructions executable by the one or more processors, that cause the one or more processors to perform acts including:

receiving, from a service in response to a user logging into a user account of the service, device association data for each of one or more peripheral devices maintained and synchronized with the user account, the device association data for a peripheral device describing how to connect the peripheral device to the computing device;

obtaining, for at least one of a second set of peripheral devices that are not automatically made available for use with the computing device, additional credentials; and making available for use with the computing device a first set of peripheral devices that are automatically available for use with the computing device and, using the obtained additional credentials, the at least one of the second set of peripheral devices.

\* \* \* \* \*